United States Patent Office 3,644,303
Patented Feb. 22, 1972

3,644,303
PROCESS FOR THE PREPARATION OF MODIFIED POLYETHYLENE POWDERS
Harald Berger, Kelkheim, Taunus, Herbert Bestian, Frankfurt am Main, and Helmut Korbanka, Gersthofen, Germany, assignors to Farbwerke Hoechst Aktiengesellschaft vormals Meister Lucius & Bruning
No Drawing. Filed Nov. 25, 1969, Ser. No. 879,911
Claims priority, application Germany, Dec. 2, 1968, P 18 12 143.2
Int. Cl. C08f 15/02, 19/02
U.S. Cl. 260—79.3 R         5 Claims

ABSTRACT OF THE DISCLOSURE

A process for the preparation of pulverulent copolymers prepared by saponifying acrylamide-N-sulfonic acids consisting of ethylene structural units and vinyl-amide structural units, and possibly further structural units of ethylenically mono-unsaturated copolymerizable monomers. The modified polyethylene powders obtained in accordance with the invention are extremely suitable for the powdering of rubber sheets and/or rubber granules, for whirl-sintering coating, as a textile reinforcement to be ironed into the material, as a supporting base for pigment preparations, as a powder base for pharmaceutical or cosmetic preparations, as a lubricant for the tablet manufacture, as well as additives to polyester and polyvinyl chloride extrusion material in order to increase the flow property in the extrusion process and to improve the impact strength of such polymers.

The present invention relates to modified polyethylene powders and a process for their manufacture.

It has been proposed to obtain polymer powders in the form of small particles by dissolving a polymer in the form of coarse particles in organic solvents at an elevated temperature and cooling these solutions, while stirring vigorously. In this process, polymer products in the form of small particles are obtained.

It has also been proposed to finely disperse coarse-particle polyolefins in the form of their melts in water containing emulsifiers, under pressure and while stirring vividly. After cooling, the precipitated polyolefin powders can be filtered off.

These processes prove to be rather complicated from the technical point of view, since in both cases it is necessary to isolate the polymer formed in the polymerization process from the polymerization mixture before dispersion takes place. Besides, the emulsifier used according to the second process contaminates the polyolefin powder and causes agglomeration.

It is further known how to break polyethylene and/or polyethylene copolymer dispersions containing foreign emulsifiers by the addition of acids. However, the product obtained by this process is also interspersed with the emulsifier precipitating at the same time, and it agglomerates. Thus powders in the form of small particles cannot be obtained in this manner.

The present invention provides a process for the preparation of pulverulent copolymers consisting of ethylene structural units and vinyl-acylamide structural units, and possibly further structural units of ethylenically mono-unsaturated copolymerizable monomers, characterized in that copolymers prepared in dispersion without any addition of foreign emulsifiers and consisting of ethylene structural units and di-alkali metal-vinyl-acylamide-N-sulfonate structural units, and possibly further structural units of ethylenically mono-unsaturated copolymerizable monomers, are saponified by means of acids.

The preparation of the ethylene copolymer dispersion used according to this invention, which does not contain any foreign emulsifiers, is carried out in known manner (Belgian patent 716,265) by copolymerizing in the presence of free radical polymerization catalysts, ethylene with di-alkali metal salts, preferably di-potassium salts of mono-unsaturated acylamide-N-sulfonic acids of the structure $R_1CH=C(R_2)CONHSO_3H$, which are dibasic because of the acid amide hydrogen, and possibly with further co-polymerizable compounds. The radicals $R_1$ and $R_2$ of the above structure can stand for hydrogen or a hydrocarbon radical having 1 to 10 carbon atoms, for example di-potassium-acrylic acid-amide-N-sulfonate, di-potassium-crotonic acid-amide-N-sulfonate, di-potassium-3-phenylacrylic acid-amide-N-sulfonate, and preferably di-potassium-methacrylic acid-amide-N-sulfonate.

Especially suitable termonomers are acrylic acid esters and methacrylic acid esters, above all the methyl and ethyl esters; also styrene, butadiene, as well as open-chain or cyclic N-vinyl-amides, such as N-vinyl-N-methyl-formamide, can be used.

The polymerization pressures are in the range of from 50 to 2,500 atmospheres gage, preferably 100 to 1,000 atmospheres gage, while temperatures are in the range of from 50 to 250° C., preferably 120 to 180° C. As free radical initiators there may be used peroxy compounds or azo compounds and preferably peroxy disulfates, such as sodium, potassium or ammonium peroxy disulfate.

The amount of the copolymerized di-alkali metal salts of the unsaturated acylamide-N-sulfonic acids is in the range of from 0.05 to 30% by weight, preferably 0.3 to 30% by weight, calculated on the solid content.

The dispersions can be prepared discontinuously or continuously.

In the case of discontinuous preparation the dispersed copolymers or terpolymers do not contain any proportion of gel and show RSV (=reduced specific viscosity) values in the range of from 0.2 to 3.0 dl./g., preferably 0.3 to 1.5 dl./g., measured with a solution of 2% strength in xylene at 85° C.

In the case of continuous preparation under the reaction conditions specified above, however, the initial copolymers contain minor proportions of gel.

The acid is preferably added to the copolymer dispersion prepared without any foreign emulsifier at temperatures in the range of from 40 to 90° C., preferably 60 to 80° C. With temperatures below 40° C., the saponification time is disadvantageously long, whereas if temperatures rise above 90° C., difficulties can be encountered because of the melting initial copolymer.

While the acid is added and also while saponification takes place, a good mixing can be obtained by stirring the copolymer dispersion vigorously.

Suitable as acids are mineral acids, such as hydrohalic acids, phosphoric acids (ortho-, poly-, metaphosphoric acid), nitric acid, preferably sulfuric acid; use can also be made of organic acids, such as aliphatic or aromatic sulfonic acids, for example methane sulfonic acid or p-toluene sulfonic acid. The acids can be added undiluted or in the form of their aqueous solutions.

After the acid has been added, thermo labile free sulfonic acids primarily result from the copolymerized di-alkali metal salts, these acids being subsequently converted into the respective carbonamides while sulfuric acid is split off. An amount of acid equivalent to the copolymeric di-alkali-metal-vinyl-acyl-amido-sulfonate is advantageously used. Since sulfuric acid is set free in the course of the reaction, less than stoichiometric amounts of acids can be used without adversely affecting the reaction. In case an excess of acid is used, it has to be washed out of the product during processing.

IR spectroscopic examinations revealed that acrylic acid structural units and/or methacrylic acid structural units, which are preferred if terpolymers are used as initial compounds, are practically not saponified under the specified reaction conditions.

In the course of the reaction with acids, the dispersion is broken. The precipitated finely dispersed copolymer in accordance with the invention can, for example, be filtered through a pressure filter or can be centrifuged. Subsequently the copolymer is washed with water until it no longer contains any salt and acid, and is then dried.

In order to bring about an intensive mixing while the polymer is precipitating from the dispersion, an effective rotary pump can be used instead of a high-speed stirrer, the rotary pump recirculating the contents of the reaction vessel 20 to 30 times per hour.

When it is dried, the loose polymer cake which primarily results from centrifuging or filtration crumbles into smaller particles from which dust-like polyethylene powders modified by carbonamide groups are obtained by means of even the slightest simultaneous or subsequent mechanical working, such as grinding, crushing between two rollers, or shaking on a smooth or sieve-like substrate, as well as by whirling in a tube.

The copolymer powders in accordance with the invention contain 99.9 to 90% by weight, preferably 99.5 to 95% weight, of ethylene structural units, and 0.1 to 10% by weight, preferably 0.5 to 5% by weight, of copolymerized vinyl-acylamide structural units, depending on the primary dispersion used.

If terpolymers are used as initial compounds, the pulverulent products obtained consist of 98.4 to 70% by weight, preferably 98.5 to 83% by weight of ethylene structural units, 0.1 to 10% by weight, preferably 0.5 to 5% by weight of vinyl acylamide structural units, and 1.5 to 20% by weight, preferably 1 to 12% by weight of structural units deriving from ethylenically mono-unsaturated copolymerizable monomers.

The carbonamide groups in the copolymers according to the invention can very well be detected by means of their characteristic bands in the infra-red spectrum which are found between 1690 and 1710 cm.$^{-1}$.

The RSV values correspond to those specified for the initial polymers, since practically no chain degradation is caused by saponification; they are therefore found in the range between 0.2 and 3.0 dl./g., preferably between 0.3 and 1.5 dl./g., measured with a solution of 2% strength in xylene at 85° C.

The sieve-analysis shows that the copolymer powders prepared in accordance with the invention are in the form of very small particles and exhibit an extremely narrow particle size distribution, the values of the latter depending to a small extent on the method of analysis.

By virtue of this extremely narrow particle size distribution and their extremely small particles, the copolymer powders obtained differ considerably from the pulverulent copolymers of analogous chemical composition known hitherto.

The wet sieve analysis performed by means of a commercial Haver and Boeker laboratory sieve EML 200/27 exhibits a particle size of less than 500$\mu$ for 90 to 99% by weight, preferably 95 to 99% by weight, of the copolymer powder in accordance with the invention; it is below 40$\mu$ for 40 to 90% by weight, preferably 80 to 90% by weight, and even below 20$\mu$ for 40 to 80% by weight, preferably 70 to 80% by weight.

It is possible to obtain an even higher degree of fineness by means of appropriate mechanical measures, such as grinding in ball mills, however, this is not required for most application purposes.

As can be seen from observations with a microscope, the copolymer powders according to the invention consist of agglomerates composed of globular primary particles.

The bulk weights of the dry powders are in the range of from 100 to 250 g./l., preferably between 120 and 170 g./l.

The modified polyethylene powders obtained in accordance with the invention are extremely suitable for the powdering of rubber sheets and/or rubber granules, for whirl-sintering coating, as a textile reinforcement to be ironed into the material, as a support for pigment preparations, as a powder base for pharmaceutical or cosmetic preparations, as a lubricant for tablet manufacture, as well as additives to polyester and polyvinyl chloride extrusion material in order to increase the flow property in the extrusion process and to improve the impact strength of such polymers.

Besides, the products according to the invention can be moulded under heat into transparent colourless sheets or other moulded articles.

The following examples serve to illustrate the invention, the parts and percentages being by weight unless otherwise stated.

EXAMPLE 1

1000 ml. of water and 3 ml. of concentrated hydrochloric acid (36%) were heated at 75° C. in a vessel with stirrer. Subsequently 500 ml. of a dispersion of polyethylene-dipotassium-methacryl-amido - sulfonate without emulsifier were added, the solid content being 40%. The proportion of dipotassium-methacryl-amido-sulfonate structural units in the copolymer was 3.2%. The reaction mixture was stirred vigorously by means of a high-speed stirrer at 75° C. for 20 minutes. In this process the dispersion was broken, and a thermostable product was primarily obtained which contained the methacrylamido-N-sulfonic acid structural unit; subsequently this product was converted into the final copolymer while sulfuric acid was split off. 2000 ml. of water were added in order to improve the filterability. The aqueous filtrate draining off was slightly turbid at first, then it became as clear as water. The polymer cake obtained by the filtration process was washed with water until it became free of any acids and salts and was then dried in a drying cabinet at 55 to 60° C. The copolymer which had agglomerated by the filtration and drying processes to form bigger lumps disintegrated into a powder of very small particles when slightly worked mechanically on a vibrating screen. The powder had a bulk weight of 120 g./l.

The dry sieve analysis performed by means of the commercial Alpine air jet sieve exhibited the following particle size distribution:

| | Percent |
|---|---|
| >500$\mu$ | 1 |
| 250–500$\mu$ | 4 |
| 125–250$\mu$ | 5 |
| 40–125$\mu$ | 10 |
| 20–40$\mu$ | 40 |
| <20$\mu$ | 40 |

The copolymer powder obtained showed a content of 1.2% (0.014 mol percent) of methacrylamide structural units. The polymer had a density of 0.9126 g./ml. and a RSV value (=reduced specific viscosity) of 1.24 dl./g., measured as a solution of 2% strength in xylene at 85° C. The penetration according to DIN 51,579 (German Industrial Standard) was 2.6×10$^{-1}$ mm.

A part of the product obtained was subsequently treated for 8 hours at 75° C. by stirring with sulfuric acid; after that the copolymer was isolated in the same manner as described above. The properties and above all the analysis data as well as the infra-red spectrum showed that the copolymer had not been modified by the subsequent treatment with sulfuric acid and that the saponification of the initial polymer had already been completed under the conditions described above.

EXAMPLE 2

2 liters of water and 27 ml. of concentrated sulfuric acid were heated at 70° C. in a vessel with stirrer. Subsequently 1 liter of an emulsifier-free dipotassium-methacrylamido-sulfonate-ethylene-copolymer dispersion having a solid content of 32.2% was added. The proportion of dipotassium-methacryl-amido-sulfonate structural units in the copolymer was 18%. After 30 minutes of intensive stirring, 2.5 liters of water were added to the precipitated dispersion. The aqueous polymer slurry was passed through a pressure filter, and the filtered polymer was washed with water until it did not contain any salts or acids. After the polymer had been dried at 60° C., an agglomerated polymer powder was obtained which disintegrated easily into lumps and which showed a bulk weight of 155 g./l. after a short treatment in a ball mill. The sieve analysis of this powder displayed a particle size of below 100$\mu$ for 96%. In accordance with the dispersion used, the copolymer prepared contained a proportion of 6.3% of methacryl-amide structural units which was confirmed by nitrogen analysis: Found: N 0.82%; calculated: N 1.04%.

The powder had a RSV value of 1.37 dl./g., measured with a solution of 2% strength in xylene at 85° C., a density of 0.9132 g./ml. and a penetration according to DIN 51,579 of $3.0 \times 10^{-1}$ mm.

EXAMPLE 3

2 liters of water were heated at 70° C. together with 3 ml. of concentrated hydrochloric acid in a vessel with stirrer. After that 1 liter of an ethylene-methacrylic acid methyl ester-dipotassium-methacryl-amido-sulfonate copolymer dispersion not containing any emulsifier was added while the reaction mixture was stirred vigorously. The solid matter of the dispersion contained 7.6% of methacrylic acid methyl ester structural units and 2.3% of dipotassium-methacrylamido-sulfonate structural units.

After 30 minutes of intensive stirring at 70° C., 2 liters of water were added, the stirring was continued for a short time, and subsequently the precipitated copolymer was centrifuged and washed with water until it did not contain any salts or acids. The dried and slightly compressed copolymer powder was crushed between two rollers. The result was a powder as fine as dust, having a bulk weight of 170 g./l. and an average particle size of 60$\mu$.

The ethylenecopolymer powder thus prepared contained 7.8% of methacrylic acid methyl ester structural units and 0.8% of methacrylamide structural units. The copolymer had a RSV value of 0.495 dl./g., measured with a solution of 2% strength in xylene at 85° C., a density of 0.920 g./ml. (20° C.) and a penetration according to DIN 51,579 of $5 \times 10^{-1}$ mm.

EXAMPLE 4

1 liter of water and 14 ml. of concentrated sulfuric acid were heated at 75° C. in a vessel with stirrer. 500 ml. of a copolymer dispersion not containing any emulsifier were added while stirring vigorously the copolymer consisting of ethylene structural units and 4.5% of dipotassium-acryl-amido-sulfonate structural units. The solid content was 44%. After 20 minutes the precipitated dispersion was filtered off, the solid matter was washed with water and dried. The isolated product represented a copolymer of ethylene containing 1.4% of acrylamide structural units. After the crushing of the loose agglomerates a fine powder with a bulk weight of 140 g./l. was obtained.

EXAMPLE 5

60 liters of water and 100 ml. of concentrated sulfuric acid were heated at 70° C. while stirring slowly, in a 100 liter vessel with stirrer.

Subsequently 20 liters of an ethylene copolymer dispersion having a solid content of 40% and not containing any foreign emulsifiers were added; the copolymer contained 3.2% of dipotassium - methacryl-amido-sulfonate structural units.

The intensive mixing which may be performed by means of a high-speed stirrer in less voluminous reaction mixtures can be taken over by an effective centrifugal pump for bigger reaction vessels, which pump recirculates the contents of the vessel about 20 times per hour. After 40 minutes of stirring at 70° C. the dispersion was broken completely. The finely dispersed saponification product was centrifuged and washed with water until it did not contain any salts or acids.

The bigger agglomerates which were still found after the drying were comminuted on a vibrating screen.

The modified polyethylene powder of extremely small particles obtained had a bulk weight of 130 g./l. The wet sieve analysis carried out by means of a commercial Haver and Boeker laboratory sieve EML 200/67 revealed a particle size distribution as follows:

|  | Percent |
|---|---|
| >500$\mu$ | 2.5 |
| 250–500$\mu$ | 6.5 |
| 125–250$\mu$ | 7.0 |
| 63–125$\mu$ | 7.0 |
| 40–63$\mu$ | 6.0 |
| 25–40$\mu$ | 1.0 |
| <25$\mu$ | 70.0 |

We claim:

1. A process for the preparation of a modified polyethylene powder which comprises saponifying an emulsifier-free dispersion of a copolymer of ethylene and 0.05 to 30% by weight of a vinyl-acylamide monomer selected from the group consisting of di-alkali metal acrylic acid amide - N - sulfonates, di-alkali metal methacrylic acid amide-N-sulfonates, di-alkali metal crotonic acid amide-N-sulfonates and di-alkali metal-3-phenyl acrylic acid amide-N-sulfonates with an acid selected from the group consisting of hydrohalic acids, phosphoric acids, nitric acid, sulfuric acid, methane sulfonic acid and p-toluene sulfonic acid at a temeprature in the range of from 40 to 90° C.

2. process as defined in claim 1 wherein the acylamide monomer is di-potassium-methacrylic acid-N-sulfonate.

3. A process as defined in claim 1 wherein the acylamide monomer is di-potassium-acrylic acid-N-sulfonate.

4. A process as defined in claim 1 wherein the copolymer additionally contains up to 20% by weight of structural units derived from an ethylenically mono-unsaturated copolymerizable monomer selected from the group consisting of methyl and ethyl esters of acrylic and methacrylic acids, styrene, butadiene and N-vinyl-N-methyl formamide.

5. A process as defined in claim 4 wherein the additional monomer is methyl methacrylate.

References Cited

UNITED STATES PATENTS

| | | | |
|---|---|---|---|
| 3,296,170 | 1/1967 | Burkhart | 260—29.6 |
| 3,405,200 | 10/1968 | Yasumura | 260—897 |
| 3,507,841 | 4/1970 | McDonald | 260—80.6 |
| 3,519,590 | 7/1970 | Henry | 260—29.6 |

FOREIGN PATENTS

| | | | |
|---|---|---|---|
| 1,011,986 | 12/1965 | Great Britain | 260—88.1 |
| 1,027,805 | 4/1966 | Great Britain | 260—88.1 |

JOSEPH L. SCHOFER, Primary Examiner

C. A. HENDERSON, Jr., Assistant Examiner

U.S. Cl. X.R.

260—79.3 M, 80.3 N, 80.7, 80.73, 80.78, 80.81, 88.1, 873, 899; 424—81